United States Patent [19]

Wakaumi et al.

[11] Patent Number: 5,231,275
[45] Date of Patent: Jul. 27, 1993

[54] BAR CODE READER

[75] Inventors: Hiroo Wakaumi; Hiroshi Ajiki, both of Tokyo, Japan

[73] Assignees: NEC Corporation; Nippon Electric Industry Co., Ltd., both of Tokyo, Japan

[21] Appl. No.: 852,448

[22] Filed: Mar. 16, 1992

Related U.S. Application Data

[62] Division of Ser. No. 647,619, Jan. 28, 1991.

[30] Foreign Application Priority Data

| Jan. 31, 1990 | [JP] | Japan | 2-21795 |
| Mar. 20, 1990 | [JP] | Japan | 2-71140 |
| Mar. 20, 1990 | [JP] | Japan | 2-71141 |
| Mar. 20, 1990 | [JP] | Japan | 2-71142 |
| Oct. 25, 1990 | [JP] | Japan | 2-287798 |

[51] Int. Cl.⁵ .............................. G06K 7/08
[52] U.S. Cl. .................... 235/449; 235/462
[58] Field of Search .......... 235/449, 450, 451, 493, 235/462; 324/207.21; 382/64

[56] References Cited

U.S. PATENT DOCUMENTS 4,574,190 3/1986 Nishimuro ............... 235/449

Primary Examiner—F. L. Evans
Attorney, Agent, or Firm—Jordan and Hamburg

[57] ABSTRACT

A bar code reader has a permanent magnet, an MR device formed integrally with the permanent magnet and a head frame housing the permanent magnet and MR device. The head frame comprises an open casing having a cut at the front end thereof. An internal lead wire faces the front end of the head frame and is fitted and fixed in the cut of the head frame. A printed circuit board on which the MR device is mounted is fixed in the opening of the head frame and electrically connected to the internal lead wire by means of a projection. An external lead wire is passed through the bottom of the head frame and spot-joined to the internal lead wire. The permanent magnet is supported at the bottom of the head frame and fixed in the head frame. A resin film is so formed as to cover the internal lead wire and fill the cut in the head frame and also to be flush at the surface thereof with the front end of the head frame.

1 Claim, 15 Drawing Sheets

BAR CODE READER

This is a division of application Ser. No. 07/647,619, filed Jan. 18, 1991.

FIELD OF THE INVENTION

The present invention relates to a bar code label in which information on each of various goods, outdoor installations, individuals or the like is recorded as engraving in the form of characters and bar codes. The invention also relates to readers for the bar code labels.

DESCRIPTION OF THE PRIOR ART

Bar code labels are well known and widely used attached on the surface of a box or package in which goods or a delivery is packed.

The bar code label carries a variety of information coded in the form of bars different in width from one another. The information is used for a higher efficiency and less labor in sales calculation, inventory control or sorting.

Generally, such bar code is black bars printed on the white surface of a bar code label.

If the label surface is stained with an oil or dirt or if the blackness of the coded bars fades, the information recorded in the bar code label cannot possibly be read positively and accurately. Particularly, there is a problem in reading the bar code label outdoors.

Recently, a magnetic bar code reading system has been proposed which can be used in any environment. In this system, engraved recesses (characters and bar codes) 202, 202', 203. . . . are made, as shown in FIG. 1, on a bar code label 201 made of a metal such as iron and the recesses are magnetically detected by means of a ferromagnetic resistance device (referred to as "MR device" hereinafter) and a permanent magnet. More particularly, the head at the bottom of a main body 204 in which the MR device and permanent magnet are integrally incorporated is swept across the engraved bar code label 201 to read the recess pattern consisting of the recesses 202, 202', 203, . . . . The principle of this bar code reading will be discussed below:

When the head is placed on the engrave bar code label 201, the engraved recesses 202, 202', 203, . . . are magnetized by the DC magnetic field formed by the permanent magnet. The magnetic field formed by these magnetized recesses causes the magnetic flux distribution over the recesses to change and these changes of the magnetic flux distribution result in resistance changes of the MR device. The resistance changes are passed to the signal processing circuit provided in the head of the main body 204 in which they are converted into binary-coded (0 or 1) signals corresponding to the code represented by the recess pattern. This binary-coded signal is supplied to the decoder for recognition of the bar code pattern.

The conventional head of the magnetic bar code reader operating on the above-mentioned principle has a tip of which the structure will be discussed below with reference to FIG. 2. Namely, for an electrical connection between an input wire of an MR device 206 made on a printed circuit board 205 through a well-known IC manufacturing process and an external lead wire 207 through which a current is supplied to detect a magnetic field change as a voltage, the circuit board 205 is connected to an electrode 209 by means of a bonding wire 208 and the external lead wire 207 is spot-joined to the electrode 209 by means of a solder joint 210. The electrode 209 and circuit board 205 are attached to an internal substrate 211. Further, the internal substrate 211 and electrode 209 are attached to a head frame 212 and sealed from below with a coating film 213. A permanent magnet 214 provided for exciting is attached to the internal substrate 211 and sealed with a coating film 215.

As the conventional sensor of the magnetic bar code reader operating on the above-mentioned principle, a generally square MR device is used as shown in FIG. 3. As seen, a magnetic resistance film 217 formed on a circuit board 216 made of, for example, a glass is provided in such a structure that it is folded back in parallel to the lateral side of the circuit board 216. For a high magnetic sensitivity, a plurality of such magnetic resistance films cascade-connected is provided. Usually, the number of the magnetic resistance films thus provided is such that the whole resistance will be on the order of several kiloohms. Furthermore, a current-supplying electrode 218 is provided on either end of the magnetic resistance film 217 in such a manner that an ohmic contact can be assured. For a higher yield of manufacture with a reduced IC area, these patterns are so set as to form together a generally square shape in many cases.

In a magnetic bar code reader, the above-mentioned MR device is inclined more than 30 deg. with respect to bar code recesses 219 and a permanent magnet 220 which applies a biasing magnetic field is provided on the MR device to make a head 221 which will be swept across recesses 223, engraved in the form of bar code in an iron sheet 222, in a direction perpendicular to the length of the engraved recesses 223, thereby reading the bar code.

A bar code label made of any other metal sheet than the iron sheet is so resistant against contamination or staining that even when the label surface is stained with dirt or the like, it can be washed with water to remove such dirt. However, in case the label is made of an iron sheet, it will be rusty and thus corroded. Particularly, any iron-sheet bar code label is not suitably usable in a place where the atmosphere is very salty.

In the head having the structure shown in FIG. 2, since the bonding wire 208 is bonded to the electrode 205 on the substrate (semiconductor substrate) of the MR device 206 by using an ultrasonic bonder or the like, an air gap d (about 0.3 mm) must be provided under these elements. This air gap causes the strength of the magnetic lines of force produced by the engraved recesses, that is to be detected by the MR device, to be extremely small. In other words, the MR device has only a low sensitivity to the magnetic lines of force formed by the bar code recesses. When the head is off the bar code label, the sensitivity of the MR device is found to be very low. For example, when the head is about 0.1 mm off the label surface in relation to a pattern of recesses of a minimum of 0.5 mm, the head can hardly read the code represented by the recess pattern.

In the bar code reader having a magnetic sensor of a structure shown in FIG. 3, since the magnetic resistance film 217 inside the reader is so large as to extend fully across one engraved recess, so the changes of magnetic field in opposite directions at the right and left recess edges cancels the magnetic resistance change of the MR device. Thus, this reader cannot read any high resolution engraved bar code composed of narrow recesses. For example, a common MR device of 0.5 to 0.6 mm in length and width should preferably be inclined 45 deg. with respect to the length of the recesses to apply a biasing magnetic field longitudinally of the recesses in order to read the bar code with a high sensitivity. In this case, however, the width of the MR device will be about 0.7 mm to 0.85 mm and thus it is apparent that the MR device cannot read any engraved recess of 0.5 mm in minimum width. Also even if a bar code reading head is constructed with the MR device not inclined 45 deg. (the biasing magnetic field may be applied from a direction inclined 45 deg.) but directed longitudinally of the engraved recesses at the sacrifice of the sensitivity to some extent, any common magnetic sensor element having a large width fitted in the head cannot read a high resolution (namely, narrow) bar code recess pattern.

SUMMARY OF THE INVENTION

The present invention has an object to overcome the above-mentioned drawbacks of the conventional techniques by providing a bar code label which does not rust and which can positively carry and preserve information for a long term.

Also the present invention has another object to provide a bar code reader by which anybody can easily read the bar code label with little possibility of error.

Further the present invention has yet another object to provide a bar code reader which can read the bar code label with a high sensitivity even if not in complete contact with the label surface.

The present invention has a further object to provide a bar code reader for a high resolution bar code label.

According to a first aspect of the present invention, the bar code label comprises a base having provided on the top surface thereof a recording area in which recesses are engraved each in a predetermined shape corresponding to information to be recorded, the base being coated with a nonmagnetic material such as plastic, nickel or the like.

According to a second aspect of the present invention, the bar code label is made of a magnetic material in which recesses are engraved each in a predetermined shape corresponding to information to be recorded, the magnetic material being coated with a nonmagnetic material to render the recesses invisible.

According to a third aspect of the present invention, the bar code label has a record area in which narrower recesses are engraved deeper.

According to a fourth aspect of the present invention, the bar code reader is an apparatus to read a bar code label on which coded information is recorded and recognize the code thereon, the apparatus comprising a head having a reading means, and an elongated main body installed pivotably and movably to the head.

According to a fifth aspect of the present invention, the bar code reader is provided, in the main body thereof, with a printed circuit board on which electrical elements are mounted which form a circuit supplied with a signal from a reading means and which processes it in a predetermined manner, and a shielding means which prevents magnetic interference from taking place between the electrical elements and the exterior of the main body and noise due to an electric field coupling from coming in.

According to a sixth aspect of the present invention, the bar code reader comprises a permanent magnet, an MR device formed integrally with the permanent magnet, a head housing the permanent magnet and MR device, an internal lead wire, a resin film, an input wire of the MR device, and an external lead wire, the head comprising an open casing having a cut at the front end thereof, the internal lead wire facing the front end of the head and fixed by being fitted in the cut of the head, a printed circuit board on which the MR device is mounted being fixed in the opening of the head and electrically connected to the internal lead wire by means of a projection, the external lead wire being passed through the head bottom and spot-joined to the internal lead wire, the permanent magnet being supported at the head bottom and fixed in the head, and the resin film being so formed as to cover the internal lead wire and fill the cut in the head and also to be flush at the surface thereof with the head front end.

According to a seventh aspect of the present invention, the bar code reader comprises an MR device and permanent magnet to read a recess pattern engraved in the form of a bar code in a bar code label, the MR device having magnetic resistance films inclined about 45 deg. with respect to the length of the recesses, parallel to each other and cascade-connected in series to each other, thereby detecting a magnetic field change over the recesses, and the permanent magnet being directed longitudinally of the bar code recesses and inclined about 45 deg. with respect to the magnetic resistance films, thereby magnetizing the bar code recesses with a DC magnetic field.

According to an eighth aspect of the present invention, the bar code reader comprises an MR device composed of a printed circuit board and magnetic resistance films which detect a magnetic field change due to a bar code label, the magnetic resistance films being integrally formed on the circuit board and inclined about 45 deg. with respect to a lateral side of the circuit board, parallel to each other and cascade-connected in series to each other.

According to a ninth aspect of the present invention, the bar code reader comprises a magnetic sensor, a means for amplifying the output signal from the magnetic sensor, means for differentiating the output signal from the amplifying means, and a means for comparing the output signal from the differentiating means with a reference voltage and coding the result.

According to a tenth aspect of the present invention, the bar code reader comprises a bridge circuit consisting of an MR device and resistors, thus forming the magnetic sensor, amplifying means consisting of a differential amplification circuit and a noninverted amplification circuit connected in series to the output of the bridge circuit, a differentiation circuit connected to the output of the amplifying means, a comparison circuit connected to the output of the differentiation circuit, and a signal processing circuit comprising a signal output circuit connected to the output of the comparison circuit.

According to an eleventh aspect of the present invention, the bar code reader is one having an MR device as magnetic sensor and in which the bridge circuit consisting of the MR device and resistors and a signal processing circuit to process the output signal from the bridge circuit are formed integrally in a signal mold.

According to a twelfth aspect of the present invention, the bar code reader is one having an MR device as magnetic sensor and in which a bridge circuit consisting of the MR device and resistors and a signal processing circuit to process the output signal from the bridge circuit are formed as a monolithic IC in a single chip.

These and other objects and advantages of the present invention will be better understood from the following description made, by way of example, of embodiments of the present invention with reference to the drawings:

DETAILED DESCRIPTION OF THE PREFERRED EMBODIMENTS

Figure 4:
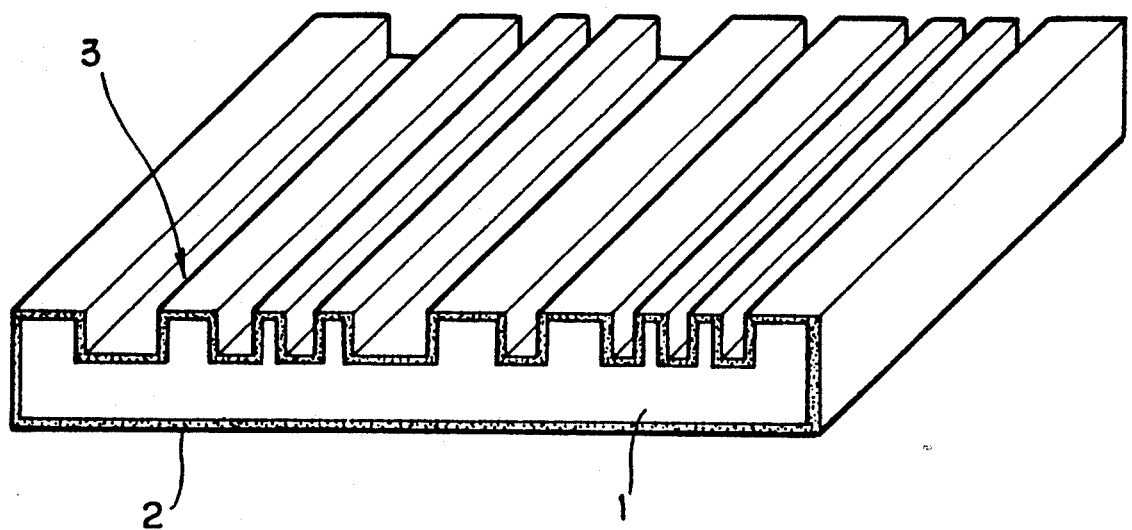
FIG. 4 is a perspective view of a bar code label according to a first embodiment of the present invention.

FIG. 4 shows a bar code label according to the present invention, this engraved bar code label comprising a base 1 having a protective film 2 formed on the outer surface thereof.

The base 1 is a square sheet made of a material such as iron or the like, the sheet having the top and bottom surfaces thereof each machined to a mirror surface to minimize surface irregularity. The base 1 has formed on the top surface thereof a record area 3 carrying, for identification, a variety of information on, for example, the name of a unit or force to which a soldier belongs or the proprietor, serial number or the like of an outdoor installation such as construction machine, vehicle, gas cylinder, machine part, steel tower or the like. The record area 3 consists of engraved recesses different in width from each other correspondingly to various information. In this first embodiment, the recesses are formed by etching or punching.

The protective film 2 is provided for long term protection of the record area 3 from erosion and corrosion and it is selected from among plastic, nickel, lead (Pb) or tin (Sn). Stainless material such as plastic, nickel or the like is applied as a thin film on the entire surface of the base 1. A film of lead or tin is applied by plating the entire surface of the base 1. Thus, according to this embodiment, the protective film 2 is applied on the entire surface of the base 1 easily and with low cost.

Figure 5:
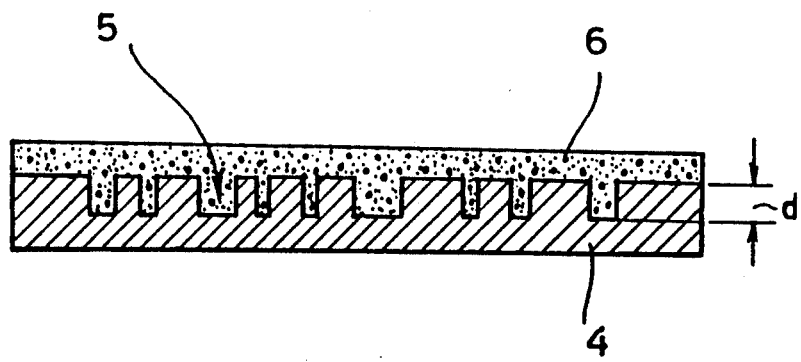
FIG. 5 is a sectional view of a bar code label according to a second embodiment of the present invention.

Next, the second embodiment of the present invention will be discussed below:

FIG. 5 shows another bar code label according to the present invention. This engraved bar code label comprises a base 4 in the form of a sheet of a ferromagnetic material such as iron (Fe), cobalt (Co), nickel (Ni) or the like and on which a record area 5 is provided which consists of recesses different in width from each other and which are engraved with a predetermined spacing from one to another recess, and a nonmagnetic film 6 so molded in the record area 5 of the base 4 as to completely fill the recesses.

Similar to the base according to the first embodiment discussed above, the base 4 in this second embodiment has the top and bottom surfaces thereof machined with a high precision to a mirror surface to prevent any reading error from taking place.

The record area 5 in this embodiment has engraved in the top surface of the base 4 recesses each having a predetermined width corresponding to information to be recorded, spaced predetermined distances from adjoining ones and engraved to a predetermined depth d. When a magnetic field is applied to this record area 5 from outside by a magnet or the like, the magnetic lines of force are concentrated laterally of the recesses, resulting in a distortion of the distribution of the magnetic lines of force. By detecting the components of the distribution in the direction of the distribution width, signals corresponding to the edges of the recesses are produced, and further by decoding the signals, the original record pattern can be recognized and reproduced.

The nonmagnetic film 6 is molded of a nonmagnetic material such as plastic or the like to a predetermined thickness onto the record area 5.

Figure 6:
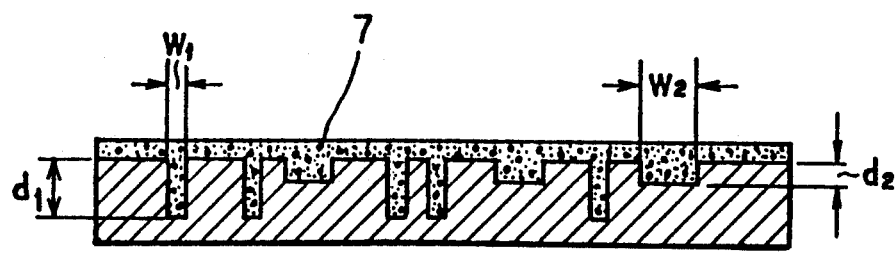
FIG. 6 is also a sectional view of a bar code label according to a third embodiment of the present invention.

The third embodiment of the present invention will be discussed below:

FIG. 6 shows yet another engraved bar code label according to the invention, in which the depth $d_1$ of a recess 7 of smaller width $W_1$ is larger than the depth $d_2$ of another recess 7 of larger width $W_2$, namely, $d_1 > d_2$.

Because the depth $d_2$ is smaller than the depth $d_1$, the magnetic field near the wide recess is prevented from being highly distorted, which leads to less distortion of the magnetic field on the adjoining narrow recess.

Therefore, according to this third embodiment, the recess depth is changed inversely to the recess width; thus, the output waveform corresponding to each recess 7 is less distorted during the information reading and thus a high information density, namely, high resolution bar code label, can be read accurately.

In the aforementioned bar code labels according to the first to third embodiments of the present invention, the record area consists of bar-like recesses, but the present invention is not limited to this shape of recess and the recesses may be formed in the shape of, for example, a predetermined symbol, character or the like.

Figure 7:
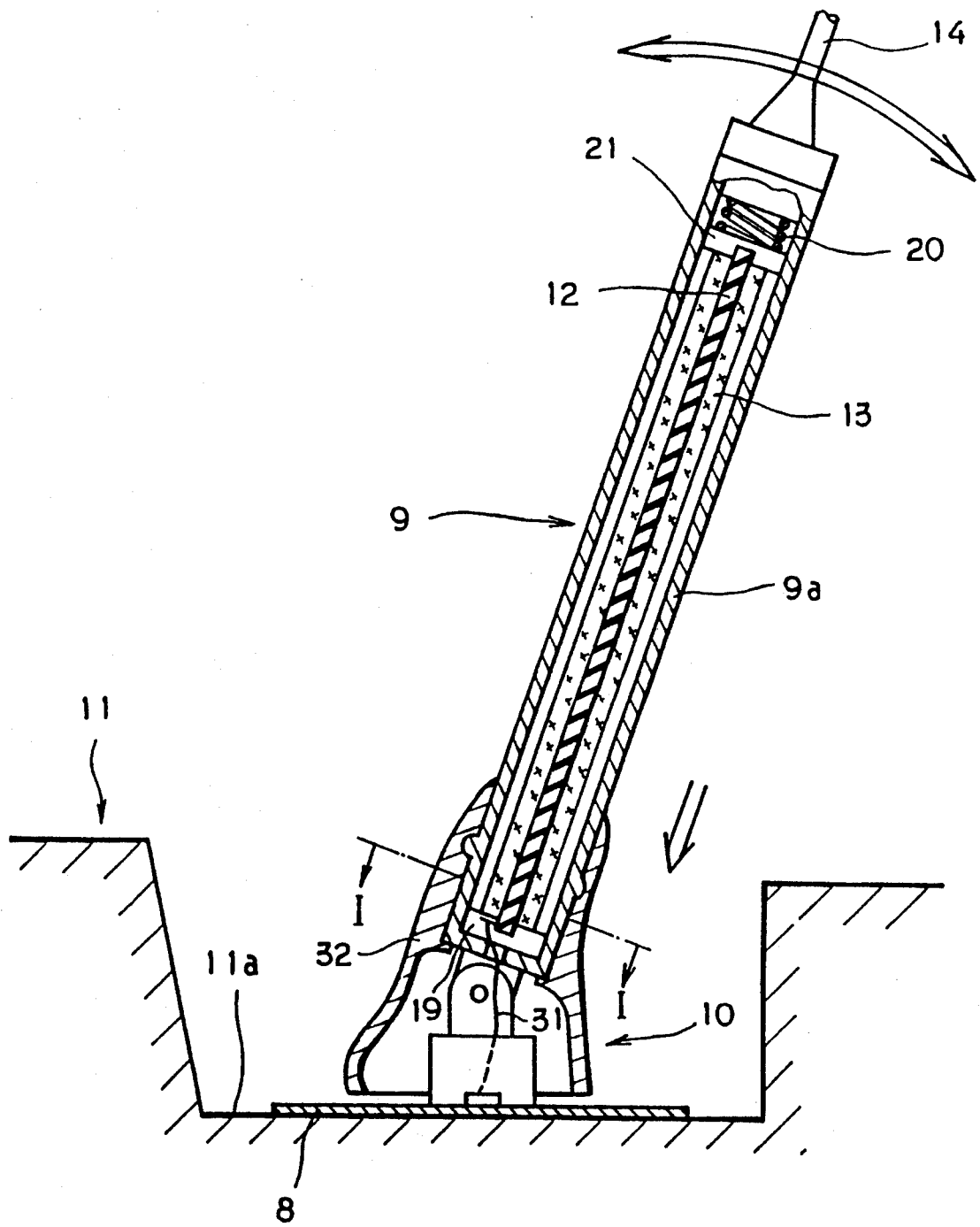
FIG. 7 is a sectional view of a bar code reader according to a fourth embodiment of the present invention.

FIG. 7 shows a bar code reader according to a fourth embodiment of the present invention. The bar code reader comprises a main body 9 and a head 10 to magnetically read a bar code label 8 on which information is magnetically recorded, for recognition of the information.

Note that the bar code label 8 is the same as the bar code label according to the aforementioned first embodiment of the present invention. That is, this bar code label 8 has a record area consisting of recesses engraved in the magnetic base, each recess having a predetermined width corresponding to a piece of information to be recorded, and the recesses being spaced predetermined distances from each other. The bar code label 8, in use, is securely attached to the bottom of a recessed portion 11a or the like of a particular item to be labelled, for example, equipment 11 which is used outdoors.

Figure 8:
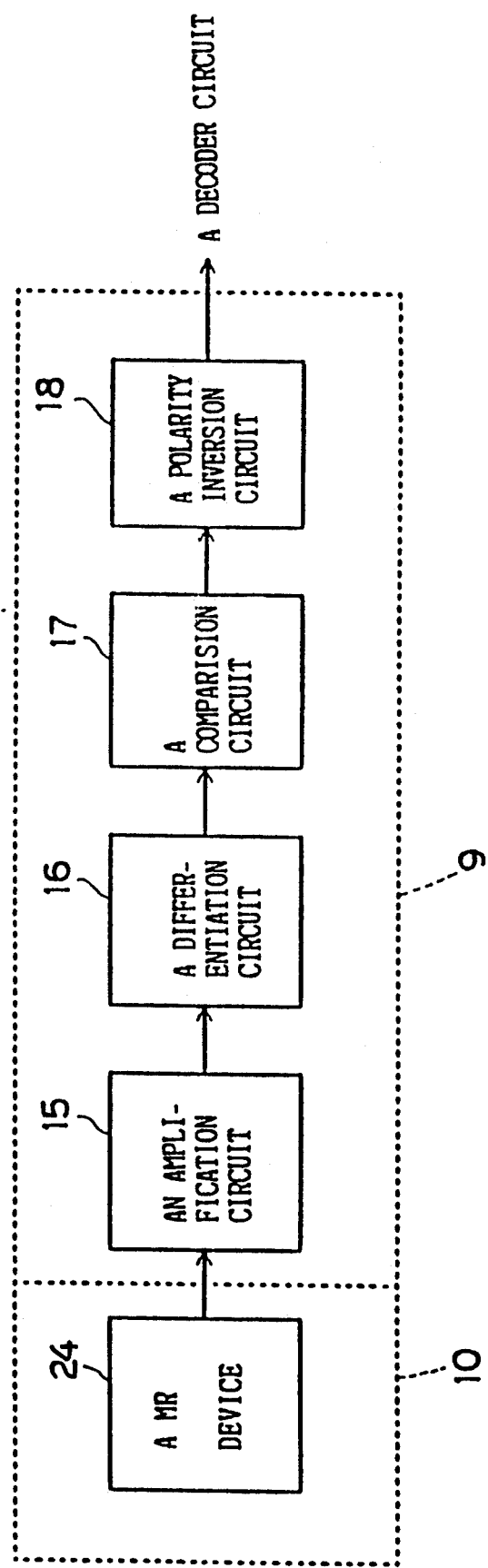
FIG. 8 is a block diagram of the circuitry in the bar code reader shown in FIG. 7.
Figure 9:
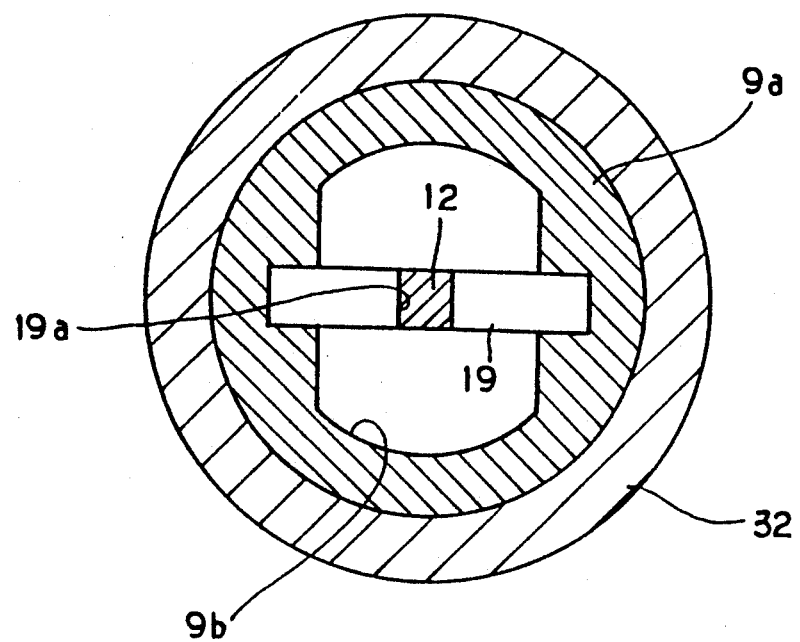
FIG. 9 is a sectional view taken along the line I—I in FIG. 7.

The main body 9 comprises a long cylinder in which there are provided printed circuit board 12 having mounted thereon electrical elements (not shown) forming together a circuit to process a signal in a determined manner and a shielding means 13 for preventing magnetic interference between the electrical elements and the exterior of the main body 9 as well as noise due to electric field coupling, and the main body 9 is connected to a decoder (not shown) outside the main body 9 by means of a cable 14. The circuit board 12 has formed thereon a signal processing circuit, of which the circuit configuration will be seen from FIG. 8, consisting of an amplification circuit 15, differentiation circuit 16, comparison circuit 17 and a polarity inversion circuit 18. The amplification circuit 15 amplifies an electric signal resulting from a magnetic resistance change caused by the MR device which will be discussed later. In this embodiment, the amplification circuit 15 is composed of two stages of amplifiers each made of a linear IC and has the input thereof connected to a bridge circuit of which the MR device is provided and the output thereof connected to the input of the differentiation circuit 16. In this differentiation circuit 16, the electric signal amplified by the amplification circuit 15 is wave-shaped in a predetermined manner for identification of the recess width in the record area on the bar code label 8. The differentiation circuit 16 has the input thereof connected to the output of the amplification circuit 15 and the output thereof connected to the input of the comparison circuit 17. The comparison circuit 17 responds to the width of each recess in the record area which is identified by the differentiation circuit 16 and converts an analog signal of a predetermined waveform into a digital signal of a rectangular waveform or the like. In this embodiment, a linear IC is used as the comparator, and the comparison circuit 17 has the input thereof connected to the output of the differentiation circuit 16 and the output thereof connected to the input of the polarity inversion circuit 18. The polarity inversion circuit 18 returns to the initial state the phase of the output waveform shifted 90 deg. during wave-shaping in the differentiation circuit 16, namely, to the phase corresponding to the recesses in the record area on the bar code label. This inversion circuit 18 consists of two stages of transistors, of which the input is connected to the output of the comparison circuit 17 while the output is connected to the input of the decoder circuit (not shown) outside the main unit 9. The elongated circuit board 12 having mounted thereon various electrical elements forming these circuits is fitted at the lower end thereof in a recess 19a formed on the top of a retainer 19 projecting upward from the bottom of a housing 19 as shown in FIG. 9, and at the upper end thereof is closely fitted in a recess formed in a retainer 21 which is urged downwardly by the resilience of a spring 20 as shown in FIG. 7. It should be noted that these circuits may be formed each by a combination of electrical elements such as individual ICs, resistors, capacitors and so forth disposed on the circuit board, and also that these elements may be combined into a hybrid IC or monolithic IC mounted on the circuit board.

Figure 10:
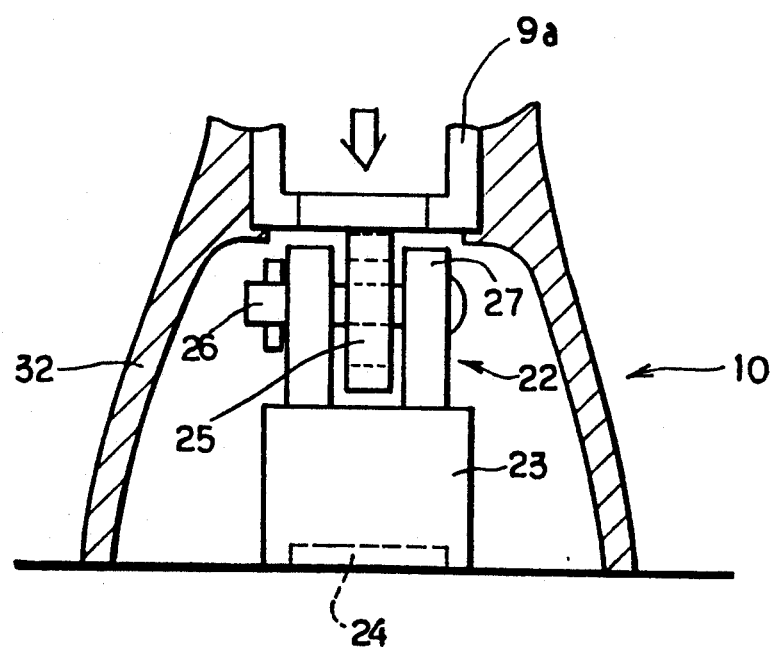
FIG. 10 is a sectional view, enlarged in scale, of the main body and head of the bar code reader according to the fourth embodiment of the present invention.
Figure 11:
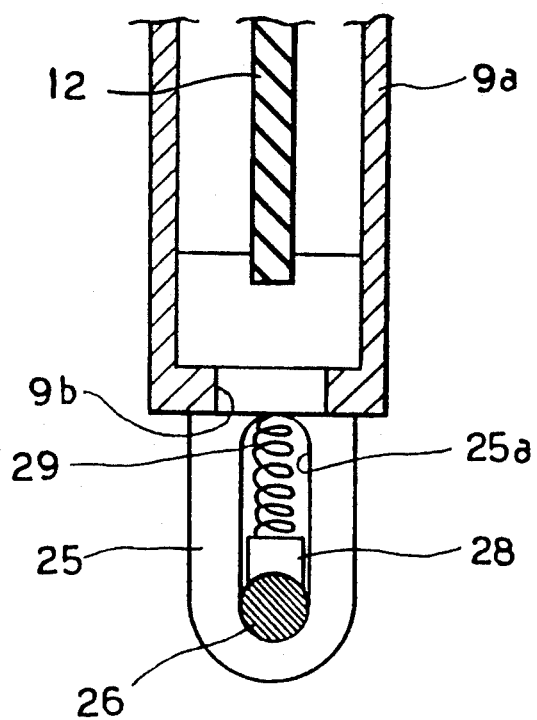
FIG. 11 is a sectional view of the connection between the main body and head in the fourth embodiment.
Figure 12:
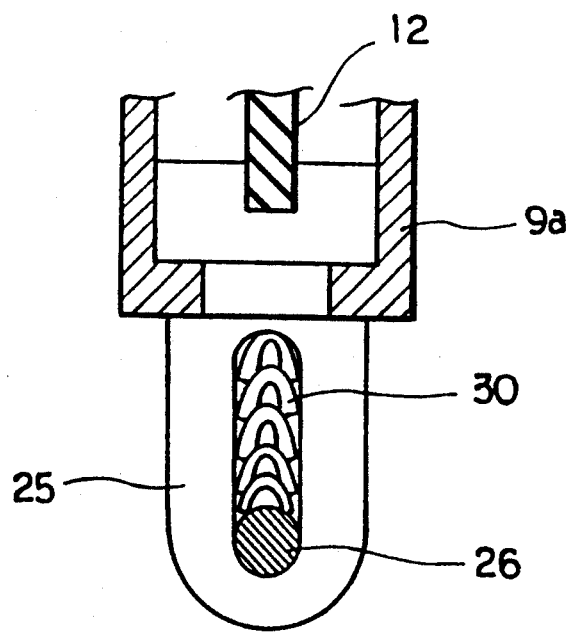
FIG. 12 is a sectional view of a variant of the connection between the main body and head in the fourth embodiment.

The head 10 is connected pivotably and movably to the main body 9, and composed of a base 23 connected to the bottom of the housing 9a of the main body 9 by means of a pivoting/moving mechanism 22, reading means 24 provided on the base 23, and a shirt 32 as shown in FIG. 10. The pivoting/moving mechanism 22 is provided to smoothly scan the head 10 for reading the bar code label 8 and to freely pivot and vertically move the head 10 in relation to the housing 9a of the main body 9. To this end, the pivoting/moving mechanism 22 comprises, as shown in FIG. 11, a coupling member 25 having an elongated hole 25a and secured to the bottom of the housing 9a, a bracket 27 pivotably supporting a pivot shaft 26 through the elongated hole 25a in the coupling member 25 and provided upright on the base 23, and a spring 29 applying a resilient force toward the pivot shaft 26 in the elongated hole 25a by means of a pusher 28 (as seen from FIG. 11). Although a resilient force is applied to the pivot shaft 26 by the coil spring 29 in this embodiment this is just an example. The present invention is not limited to this embodiment but, for example, a plurality of generally inverted V-shaped leaf springs 30 may be used in place of the coil spring, as shown in FIG. 12. As the reading means 24, an MR device is employed. In this embodiment, an MR device and predetermined resistors are combined to form a bridge circuit. The output of the bridge circuit is connected to the input of the amplification circuit 15 provided on the circuit board 12 by means of an interconnecting cord passed through a hole 9b at the bottom of the housing 9a. Note that the MR device is so designed that the internal resistance changes corresponding to the size of external magnetic field and it is made of a silicon compound semiconductor, ferromagnetic film (metal) or the like.

Figure 13:
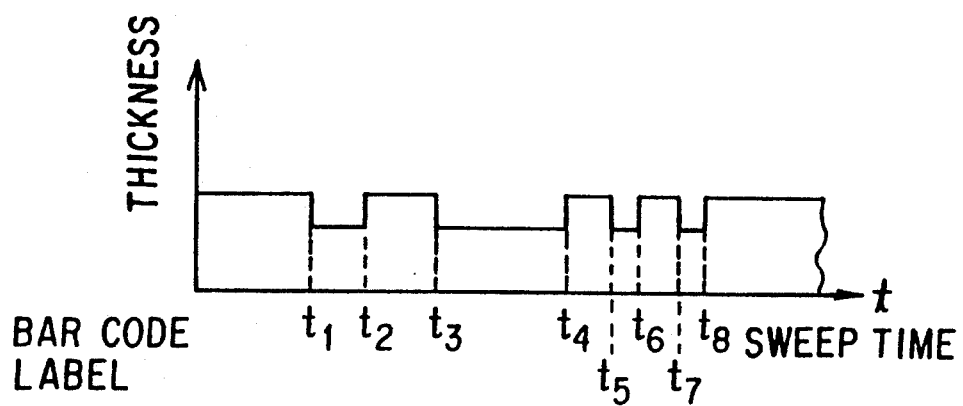
FIG. 13 graphically shows the relation between the sweep time and recess positions in the bar code label when the latter is read by the bar code reader according to the fourth embodiment of the present invention.
Figure 14:
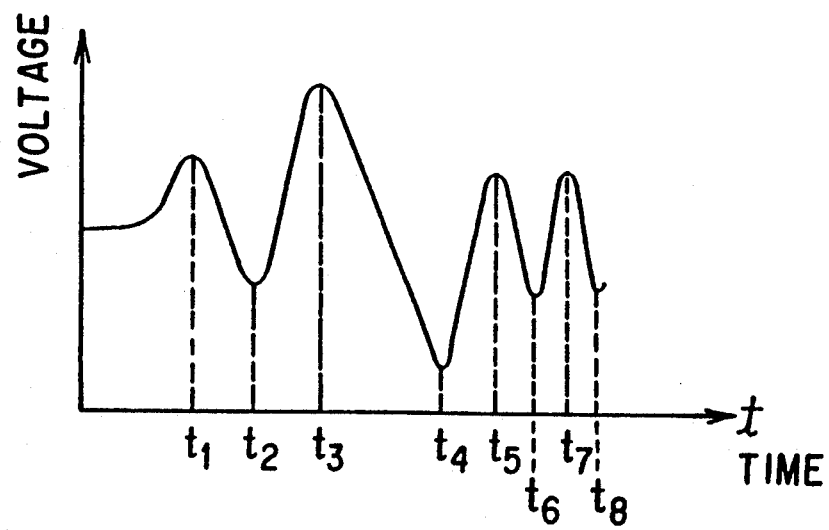
FIGS. 14 to 16 show waveforms of signals delivered from the bridge circuit, differentiation circuit and comparison circuit, respectively, when the bar code label is read by the bar code reader according to the fourth embodiment of the present invention, the waveforms showing the changes of the respective signals as time passes.

Next, how each of the circuits involved in this embodiment functions will be discussed below:

Assume that the bar code reader according to this embodiment is used to scan an engraved bar code label 8 having, for example, a shape (thickness) as shown in FIG. 13. The bridge circuit comprising the MR device delivers a signal of a waveform of which each of the extreme values corresponds to a respective recess boundary as seen from FIG. 14.

Figure 15:
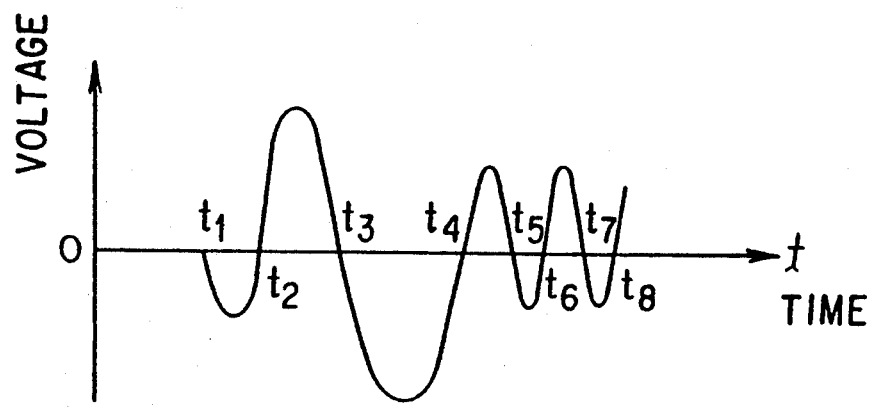

Next, this output signal from the bridge circuit is amplified by the amplification circuit and then supplied to the differentiation circuit 16 which in turn will deliver to the comparison circuit 17 a signal of a waveform phase-shifted from the output waveform from the bridge circuit and precisely corresponding to the recesses on the bar code label 8 as shown in FIG. 15.

Figure 16:
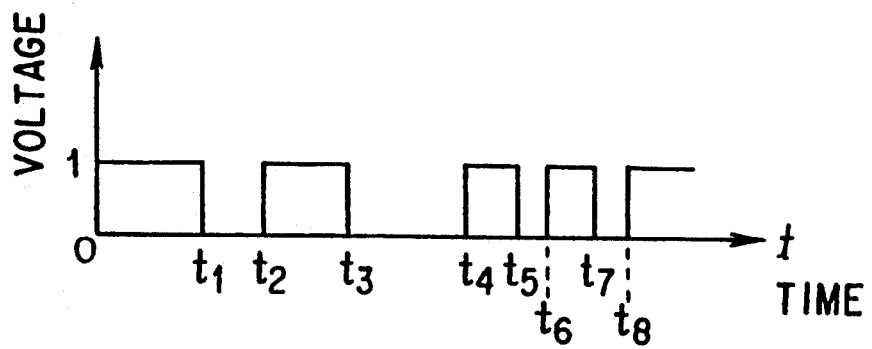

Then the comparison circuit 17 delivers a coded digital signal corresponding to the shape of the recesses in the bar code label 8 as shown in FIG. 16.

Hence, in this embodiment, even if the bar code label 8 is secured in, for example, a narrow recessed portion 11a as shown in FIG. 7, it can be positively scanned and read by the head by pivoting the main body 9.

Figure 17A:
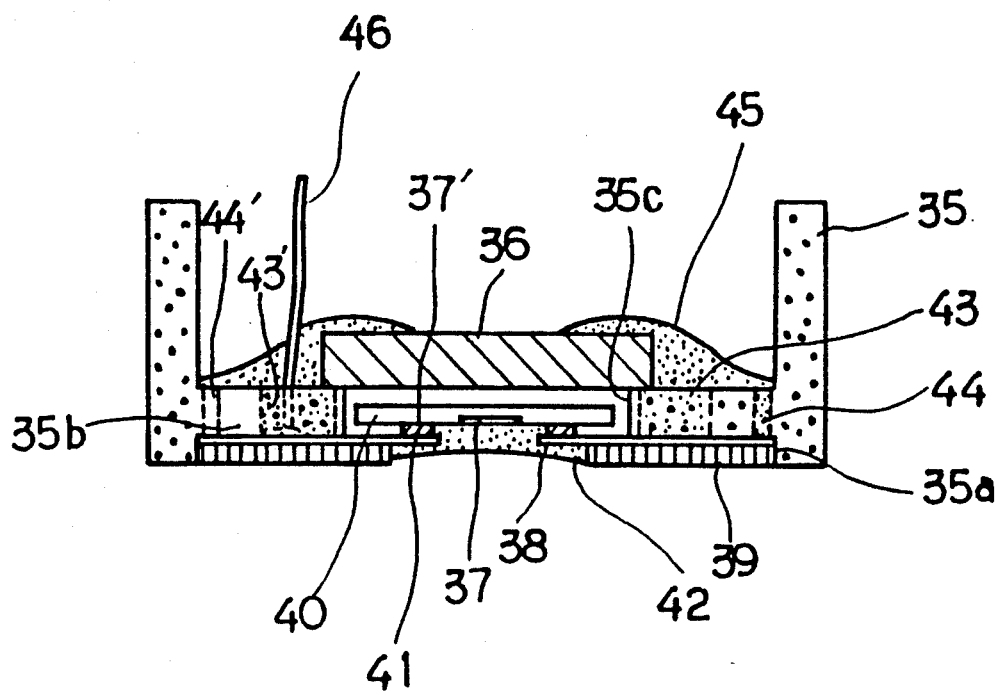
FIG. 17(a) schematically shows the construction of the head of the bar code reader according to a fifth embodiment of the present invention.
Figure 17B:
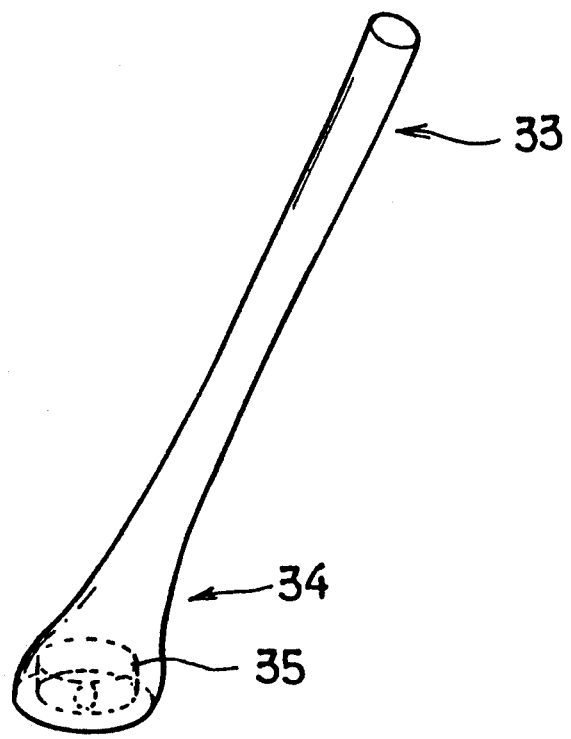
FIG. 17(b) is a perspective view of the pen head in which the head shown in FIG. 17(a) is built.

FIG. 17(a) shows the construction of the bar code reader according to a fifth embodiment of the present invention, and FIG. 17(b) shows the shapes of a main body 33 and head 34 of this bar code reader.

Figure 1:
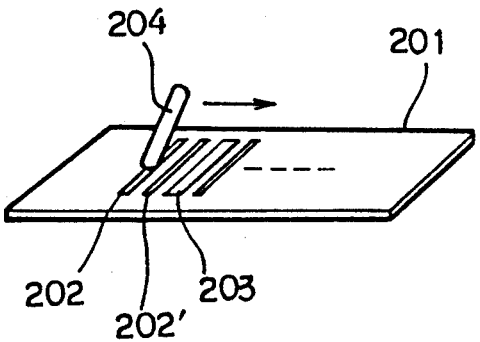
FIG. 1 is a schematic illustration of the essential part of the conventional bar code label.
Figure 2:
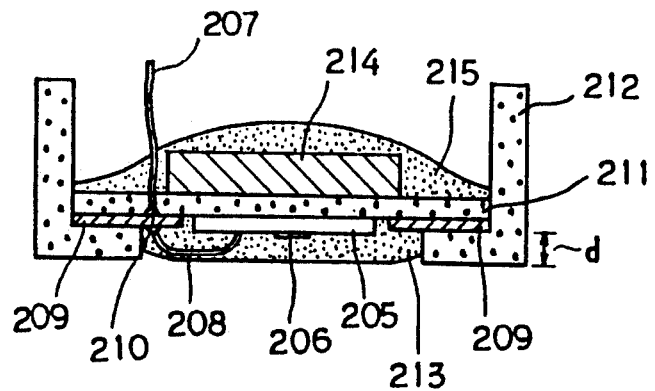
FIG. 2 is also a schematic illustration showing the construction of the head of the conventional bar code reader.
Figure 3:
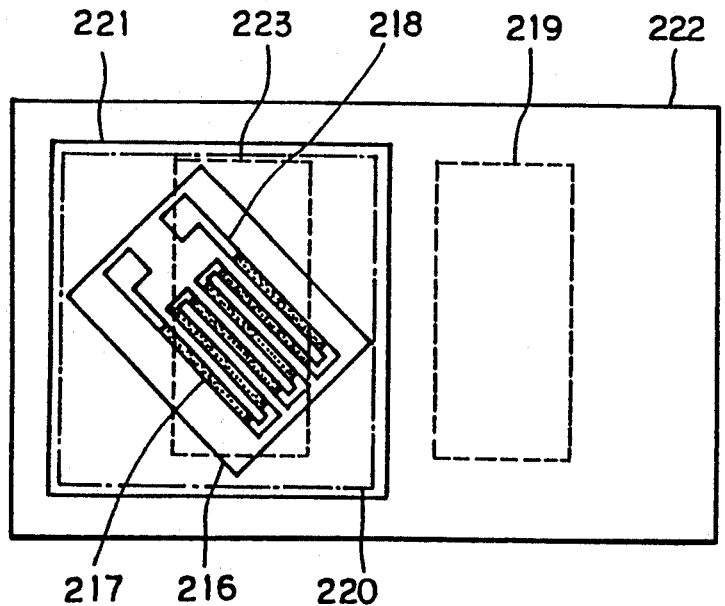
FIG. 3 schematically illustrates the construction of the conventional bar code reader having a MR device.

The bar code reader according to the present invention has a pen head-type structure to sweep the bar code label 201 (basically the one shown in FIG. 1) and read the code thereon. The head at the tip of the reader is built in a head frame 35 as shown in FIG. 17(a). The head frame 35 is an open casing having a cut 35a formed at the end thereof. According to the present invention, a permanent magnet 36 is supported on the bottom 35b within the head frame 35 and a printed circuit board on which an MR device 37 is formed by predetermined IC manufacturing process is supported on an internal lead wire 38 in a hole 35c and facing the end of the head frame 35.

The internal lead wire 38 is formed on a resin film 39 by patterning. The resin film 39 is fitted in the cut 35a and the surface thereof is so shaped as to be flush with the end of the head frame 35. The internal lead wire 38 and circuit board 40 are joined to each other by means of a projection 41. The projection 41 is previously attached to the internal lead wire 38 and connected, by being pressed from the resin film side by means of a bonding tool, to an input wire 37' of the MR device 37 laid on the circuit board 40.

The input wire 37' is made of Au or the like while the internal lead wire 38 is of Cu or the like.

The resin film 39, internal lead wire 38 and circuit board 40 are coated with a resin film 42 for protection from the environment and also for prevention of their separation. Passing through the bottom 35b of the head frame 35 are circular or square through-holes 43', 44 and 44' through which resin for forming a resin coating 45 is passed to secure the resin film 39 and internal lead wire 38 to the head frame 35.

It should be noted that the permanent magnet 36 is mechanically fixed to the head frame 35 by means of the coating 45.

An external lead wire 46 through which a is supplied to the MR device 37 which detects a resistance change is passed through the bottom 35b and solder-joined to the lead wire 38.

Figure 18A:
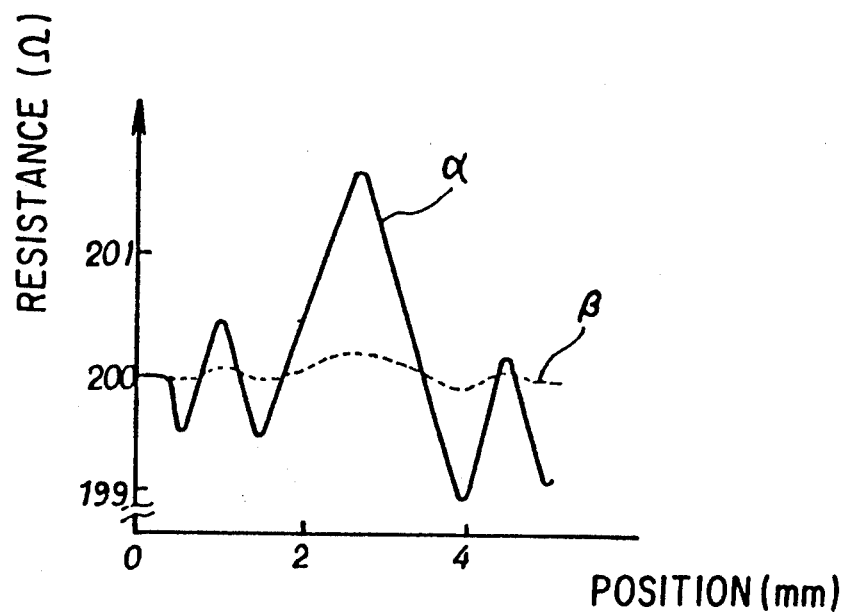
FIG. 18(a) shows the resistance change characteristics of the MR device when the head sweeps across the bar code label.
Figure 18B:
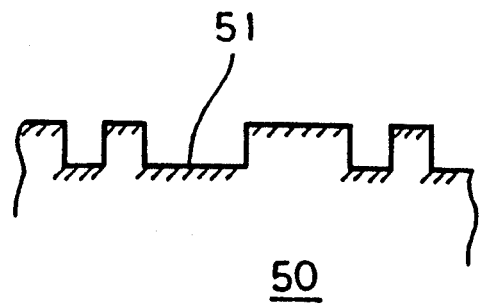
FIG. 18(b) shows the positions of the recesses engraved in the bar code label which correspond to the magnetic resistance change characteristics in FIG. 18(a)

In the head 34 of such construction, the resin film 39, internal lead wire 38 and projection 41 are 0.1 mm, 0.05 mm and 0.01 mm thick, respectively. The gap between surface of the resin film 39, namely, the end of the detector (end of the head frame), and the surface of the MR device (circuit board surface) is about 0.15 mm. This gap size is nearly half in the conventional reader in which a bonding wire is used. Because of the fact that magnetic field strength attenuates in pro to one/square or one/cube of distance, the sensitivity of detection is four times higher than in the conventional reader. FIG. 18(a) shows the magnetic resistance change when the reader is swept across a bar code label 50 (with minimum recess pattern of 0.5 mm) made of a metal. FIG. 18(b) shows the relation between the recesses engraved on the bar code label 50 and the magnetic resistance change. The resistance change characteristic $\alpha$ is one obtain when the bar code reader according to the present invention was used while the characteristic $\beta$ is one obtained by using the coventional reader. In the reader according to the present invention, the magnetic resistance changes more greatly than in the bar code reader of the conventional structure. Even when the head 34 is swept at a height of about 0.1 to 0.2 mm above the top surface of bar code label, the code could be accurately read.

Having a high sensitivity as mentioned the bar code reader according to the present invention ca an engraved record in a bar code label even when the latter is somewhat stained with an oil, dust or minute metal pieces.

Since being able to tolerate fluctuation of sensitivity equivalent to distancing the head from the top surface of the bar code label approximately 0.1 to 0.2 mm, the bar code reader according to the present invention is highly reliable.

Figure 19A:
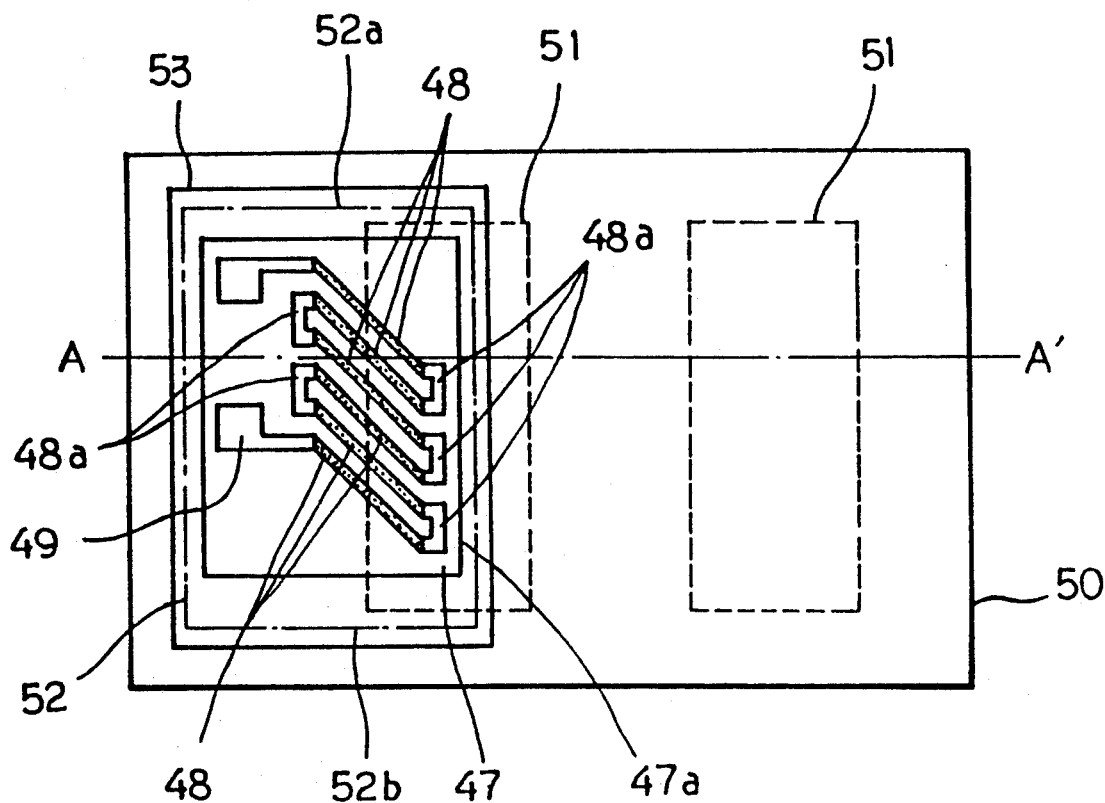
FIG. 19(a) is a plan view showing the construction of a bar code reader using an MR device according to a sixth embodiment of the present invention.
Figure 19B:
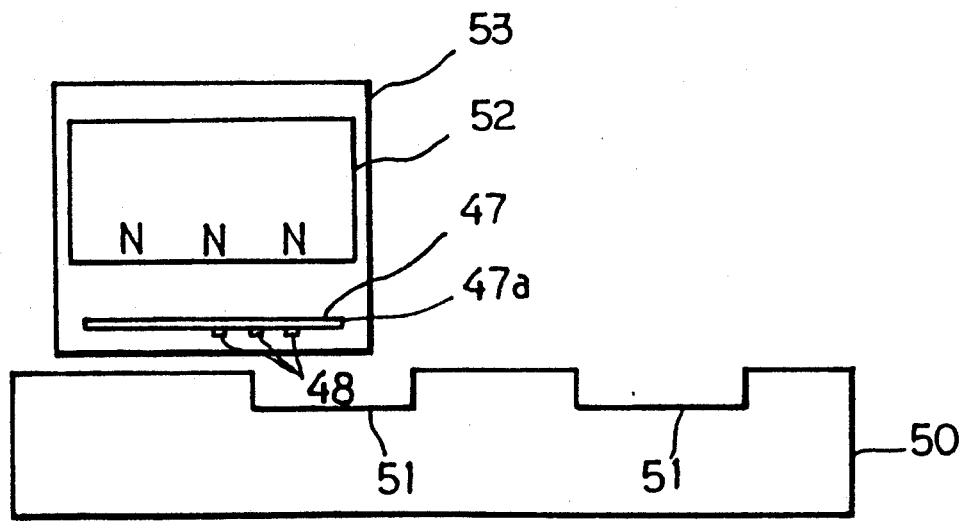
FIG. 19(b) is a sectional view taken along the line A-A' in FIG. 19(a)

Next, the MR device according to the sixth embodiment of the present invention and a bar code reader using the MR device will be discussed below:

As shown in FIGS. 19(a) and 19(b), the MR according to the present invention is composed of magnetic resistance films 48 formed on the surface of the circuit board 47 which is made of Si, glass or the like, and an electrode 49 of Au or the like through which a current is supplied to the magnetic resistance films 48. The ends of the magnetic resistance films 48 are in vertical alignment and the magnetic resistance films are parallel to each other and inclined about 45 deg. with respect to the lateral sides of the circuit board 47, and they are cascade-connected in series to each other by means of electrically conduit. 48a. Thus, since the width, i.e., the dimension aligned with the width of the recesses, of the array of magnetic resistance films 48 which detect a magnetic field change is less than the longitudinal length of the array, namely, about 70% thereof, the magnetic resistance films 48 will not extend on both the opposite sides of engraved recesses 51 in the same bar code label 50 as in the aforementioned fifth embodiment, so the bar code label 50 can be read even if the engraved recesses 51 in the bar code label 50 form a high density pattern. When the array of magnetic resistance film 48 is, for example, 0.5 to 0.6 mm long, its width is only 0.35 to 0.42 mm. Namely, it is possible to read bar code recesses of each 0.5 mm in width by the head according to this embodiment. Further, in case the bar code recess width is made smaller, high resolution bar code reading can be assured by shortening the length of each of the magnetic resistance films 48 while increasing the number of the films 48 vertically cascade-connected. In the conventional pattern of magnetic resistance films, however, since the ends of the respective films will overlap on each other even though the films are cascade-connected, no high density bar code pattern can be read. Therefore, the structure of the head according to the present invention is advantageous for reading a high resolution pattern.

With the arrangement of the head according to the present invention, the larger the number of magnetic resistance films, the higher the sensitivity of detection of magnetic resistance change due to the bar code recesses. Thus, the present invention is also advantageous for providing a highly sensitive reader.

In the bar code reader according to the present invention, a permanent magnet 52 used in conjunction with the aforementioned MR device is positioned as will be discussed below. Namely, for biasing the magnetic resistance films 48 of MR device, the permanent magnet 52 is so disposed that the poles 52a and 52b thereof are shifted 45 deg. with respect to the length of the array of films 48. As shown in FIG. 19(a), the permanent magnet 52 is mounted on the circuit board 47 of the MR device such a manner that the poles 52a and 52b are positioned vertically, that is, on an axis parallel to the length of the recesses 51. Thus, the MR device can be set in the most sensitive, optimum biased state. At this time, the magnetic resistance films 48 are vertically biased. When the head 53 using the permanent magnet 52 and the MR device in conjunction with each other is swept in relation the recesses 51 on the bar code label 50 with the lateral side 47a of the MR device circuit board and that of the permanent magnet 52 being nearly flush with the length of the recesses 51 as shown in FIGS. 19(a) and 19(b), the magnetic field changes due to the recess edges are applied in the sweeping direction so that the MR device will cause the magnetic field changes to incline in a direction within a range of $+/-45$ deg., and thus the magnetic field will fully change within a linear magnetic resistance change range of the MR device. Namely, the bar code can be read in a wide dynamic range. Thus, even if the head is swept somewhat above the bar code label, a stable reading of the label can be assured since the resulting voltage signal amplitude corresponds to a relatively large magnetic resistance change.

Namely, the bar code reader according to the present invention is highly reliable.

Figure 20:
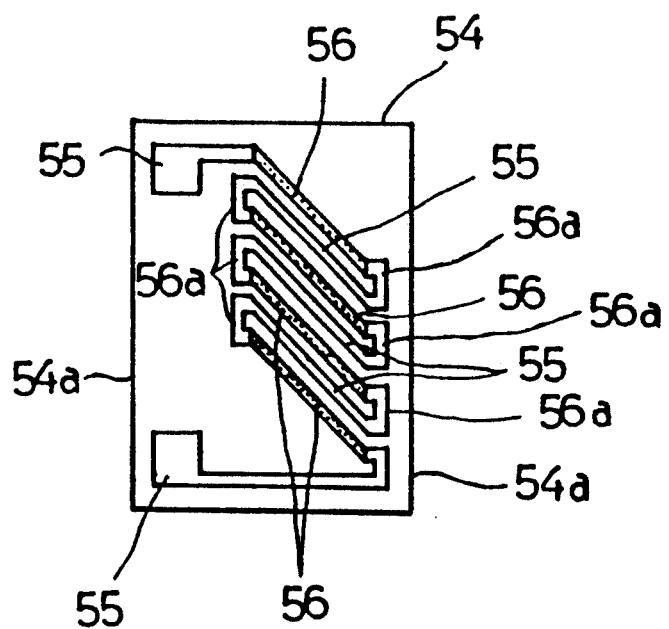
FIG. 20 is a plan view showing the construction of an MR device according to a seventh embodiment of the present invention.

FIG. 20 shows the structure of the MR device according to the seventh embodiment of the present invention.

According to this seventh embodiment, the lower one (55) of current-supplying electrodes 55 and 55 extends on a printed circuit board 54 from one lateral side 54a of the circuit board toward the other lateral side 54a, magnetic resistance films 56 are disposed at an inclination of 45 deg., the lowest one of the films 56 extends to and is connected to the lower electrode 55, and the magnetic resistance films 56 are cascade-connected to each other with the electrode 55 interposed between adjoining 56. Thus, since the current is supplied only in one direction to the magnetic resistance films 56, no resistance change due to magnetic field depending upon the direction of the current will occur, so that a stable detection of magnetic field change is assured. The operating principle and other effects of this embodiment are quite the same as those in the aforementioned sixth embodiment.

Figure 21:
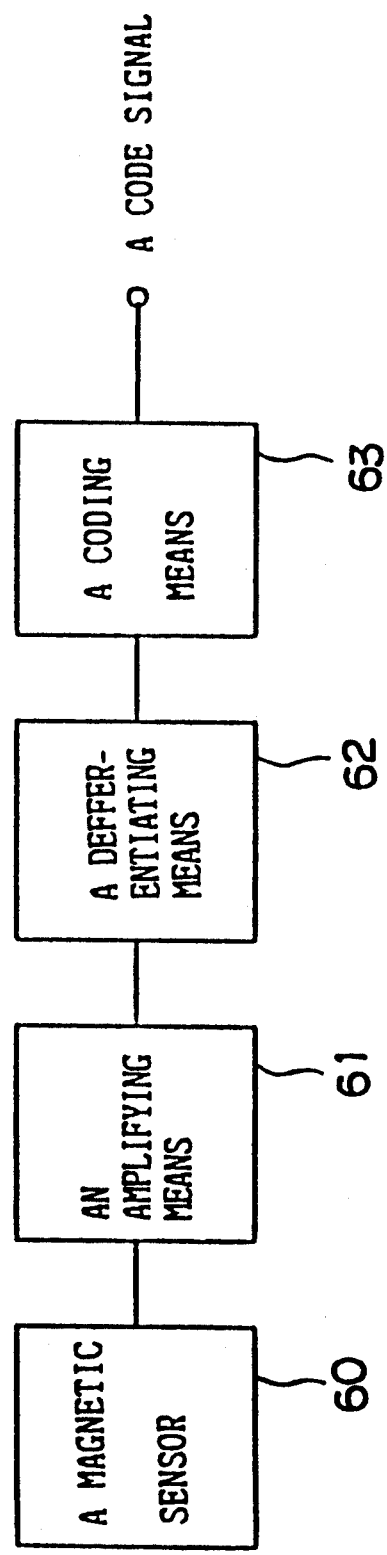
FIG. 21 is a block diagram showing the construction of a bar code reader according to an eighth embodiment of the present invention.

Next, the eighth embodiment of the present invention will be discussed below:

FIG. 21 is a block diagram of the bar code according to the eighth embodiment of the present invention. As seen from FIG. 21, the bar code reader according to this embodiment comprises a magnetic sensor 60 having an MR device as essential element, an amplifying means 61 to amplify an analog voltage waveform output from the magnetic sensor 60, a differentiating means 62 to detect a start signal of the amplified analog voltage waveform and also to differentiate this analog voltage waveform, and a coding means 63 to shape the differentiated signal and extract a code signal therefrom.

Figure 22:
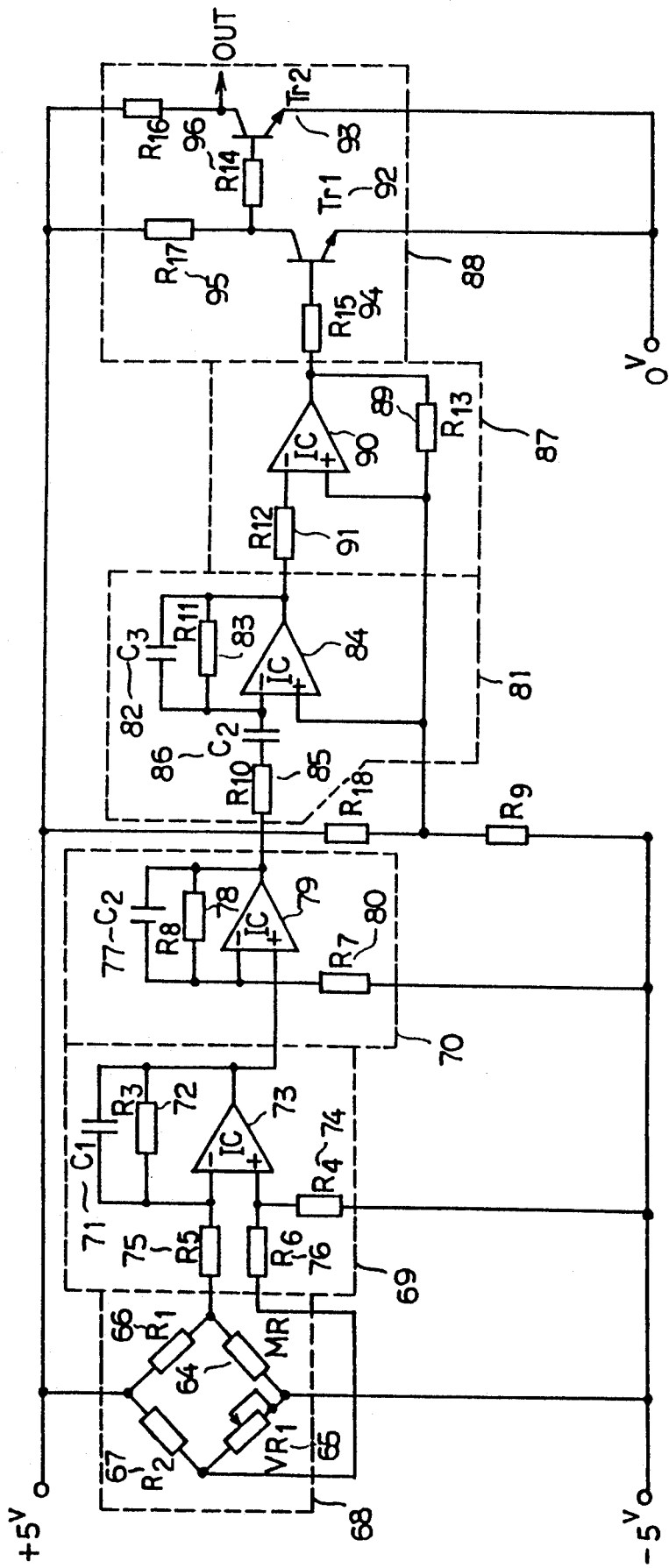
FIG. 22 is a block diagram of an internal circuit composing the magnetic sensor in the bar code reader according to the eighth embodiment of the present invention.

FIG. 22 is a block diagram showing the component circuits of the bar code reader according to the eighth embodiment of the present invention.

As shown in FIG. 22, an output voltage from a bridge circuit 68 consisting of an MR device 64 and resistors 65, 66 and 67 and thus forming the magnetic sensor is supplied to a differential amplification circuit 69 which forms, together with a noninverted amplification circuit 70, the above-mentioned amplifying means 61.

The differential amplification circuit 69 is composed of a linear IC 73 having a negative feedback circuit consisting of a capacitor 71 and resistor 72, and three input resistors 74, 75 and 76. This differential amplification circuit 69 amplifies a differential voltage of a signal supplied to the negative and positive terminals of the linear IC 73 from the bridge circuit 68 and delivers it to the noninverted amplification circuit 70. This circuit 70 consists of a linear IC 79 having a negative feedback circuit composed of a capacitor 77 and resistor 78, and an input resistor 80. The output signal from this noninverted amplification circuit 70 is supplied as input to a differentiation circuit 81 forming the differentiating means 62.

The differentiation circuit 81 consists of a linear IC 84 having a negative feedback circuit composed of a capacitor 82 and resistor 83, a series circuit composed of a resistor 85 and capacitor 86 connected to the negative terminal of the linear IC 84, and a reference voltage source connected to the positive terminal. This differentiation circuit 81 delivers to a comparison circuit 87 forming the coding means 63 on output signal phase-shifted 90 deg. with respect to the input signal.

The comparison circuit 87 consists of a linear IC 90 having a positive feedback circuit formed by a resistor 89, a resistor 91 connected to the negative terminal of the linear IC 90, and a reference voltage source connected to the positive terminal of the linear IC 90. This comparison circuit 87 compares an input signal supplied to the negative terminal with the reference voltage applied to the positive terminal and delivers an output pulse "H" or "L" to a signal output circuit 88.

The signal output circuit 88 is formed by two transistors 92 and 93 so connected as to turn on and off in such a manner that when one of the transistors turns on, the other turns off and when the one turns off, the other turns on. More particularly, when the transistor 92 is turned on by a pulse "H" supplied to the base terminal of the transistor 92 through a resistor 94, a current flows from the collector of the transistor 92 to the emitter thereof through a resistor 95 connected to the connector terminal thereof. As a result, the base voltage of the transistor 93 connected to the collector terminal of the transistor 92 through a resistor 96 drops, so that the transistor 93 is turned off. Likewise, when the pulse supplied from the comparator circuit 87 is "L", the transistor 92 is turned off while the transistor 93 is turned on. Thus, the output pulse from the comparison circuit 87 is delivered as a pulse of an inverted polarity at the signal output circuit 88.

The functional sequence of the magnetic sensor 60 will be discussed with reference to FIG. 23.

Figure 23A:
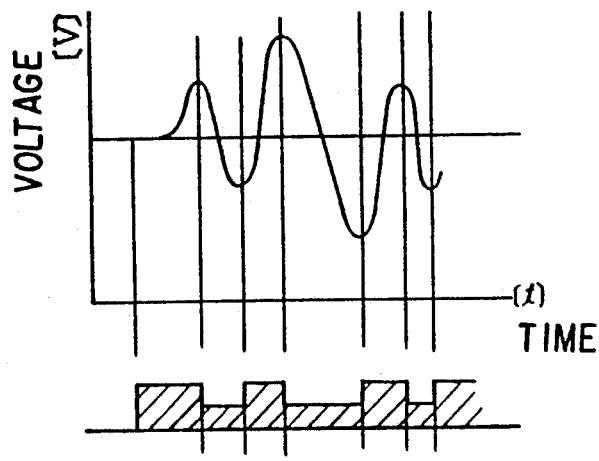
FIGS. 23(a) to (c) show signal waveforms, respectively, at various points of the magnetic sensor according to the eighth embodiment of the present invention.
Figure 23B:
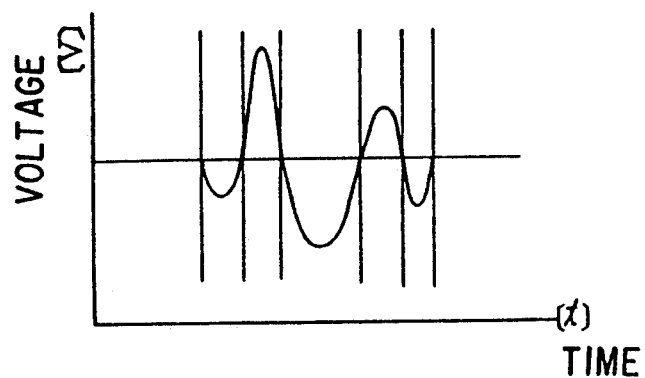
Figure 23C:
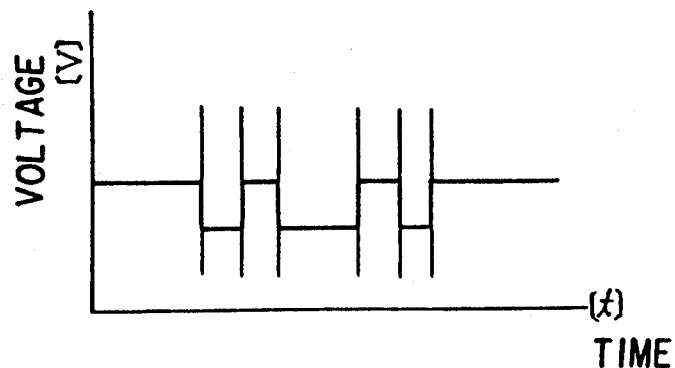

FIGS. 23(a), 23(b) and 23(c) show the signal waveforms at various portions of the magnetic sensor 60; in particular, FIG. 23(a) shows the waveform of the output voltage from the bridge circuit 68, corresponding to the shape of the engraved magnetic recesses, FIG. 23(b) shows the waveform of the output voltage from the differentiation circuit 82, and FIG. 23(c) shows the coded pulse groups, which is the output from the comparison circuit 87.

When the bar code-like magnetic recesses engraved in the bar code label are magnetized by the magnetic field source such as the permanent magnet or the like provided in the bar code reader, the magnetic field is changed by the engraved recesses (the magnetic field becomes the maximum and minimum at the recess edges) and the change amount appears as a change of the output voltage of the bridge circuit 68.

The output signal resulting from the amplification of the output from the bridge circuit 68 is further amplified, then phase-converted and appears as a change in duration of the output pulse delivered from the comparison circuit 87.

More particularly, the recess width is proportional to the output pulse width. So, the bar code reader using the magnetic sensor 60 according to the present invention can be used to read the bar code formed by a plurality of recesses different in width and spacing between them, namely, the information recorded in the record area.

It is apparent that the magnetic sensor thus constructed is different in structure from the conventional ones used in speedometers, printers and the like. Provided with an extreme value detecting means, the magnetic sensor according to the present invention can magnetically detect and reproduce a pattern on a magnetic bar code label with a high effectiveness and efficiency.

Thus, even if stained with dirt or the like or somewhat impaired, the pattern on the bar code label (metallic) can be read accurately.

Furthermore, the magnetic sensor may be made in the form of a single mold or a single chip. Since the mold or chip are very small devices, a handy bar code reader can be designed.

As having been discussed in the foregoing, a bar code label according to the present invention has recesses engraved in a record area on the bar code label. Even with any staining, sunlight or the like, the record area cannot be lost. Therefore, information can be positively recorded on the bar code label, particularly for outdoor use for a long term.

A magnetic engraved bar code label according to the present invention permits recording information on the magnetic material with a width and spacing corresponding to the information based on the fact that when to the record area made of a magnetic material an external magnetic field is applied from a ferromagnetic material such as a magnet or the like, the distribution of magnetic lines produced by the respective recesses in the record area is changed at the recess edges.

Engraved bar code labels according to the present invention are made of a ferromagnetic material (metal) coated with a resin or the like. So even if stained or somewhat impaired, the label can still be used. Namely, it can be suitably used in an environment such as outdoors, factories or the like where the label is likely to be stained.

A bar code reader according to the present invention may be so constructed that the head is rotatably coupled to the main body. Thus, the user can take a convenient position when reading the bar code label, and just by pressing the main body with a predetermined force, the head is moved toward the label surface and can be positively put into close contact with the label surface, whereby any reading error can be prevented. Therefore, the bar code reader according to the present invention is highly reliable.

Also, a bar code reader according to the present invention may use a structure in which the MR device and lead wires are connected to each other by means of a projection, which can surely provide a highly reliable bar code reading system. Even if stained with oil, dust or mud, this reader can still be used normally. Thus, it can be used effectively in any desired environment, such as outdoors, factories or the like.

A bar code reader according to the present invention may use an MR device consisting of obliquely extending, cascade-connected magnetic resistance films, permitting reading a high density bar code pattern with a high sensitivity. By adopting a bar code detector in which a permanent magnet is so disposed as to provide a biasing from a direction shifted about 45 deg. with respect to the length of the MR device, the MR device can be operated in a wide dynamic range, thereby permitting a high sensitivity reading. Namely, the bar code reader of the present invention provides for a highly reliable bar code reading system.

A bar code reader according to the present invention incorporates a magnetic sensor and thus provides for a bar code reading system which is highly durable, not easily affected by the operating environment, hardly influenced by staining or impaired during storage or transportation and which is easy to handle in reading information from bar codes or the like.

A bar code reader of the present invention may have the internal circuit formed in an integral mold or a single-chip monolithic IC, whereby the reader not only is more reliable but also can be manufactured more compact and with lower costs.

What is claimed is:

1. A bar code reader having a permanent magnet and an MR device formed integrally with the permanent magnet, comprising:
   a head frame housing said permanent magnet and MR device;
   an internal lead wire, a resin film, an input wire of said MR device, and an external lead wire;
   said head frame comprising an open casing having a cut at the front end thereof;
   said internal lead wire facing the front end of said head frame and being fitted and fixed in said cut of the head frame;
   a printed circuit board on which said MR device is mounted being fixed in the opening of said head frame and electrically connected to said internal lead wire by means of a projection;

said external lead wire being passed through the bottom of said head frame and spot-joined to said internal lead wire;
said permanent magnet being supported at the bottom of said head frame and fixed in said head frame; and
said resin film being so formed as to cover said internal lead wire and fill said cut in the head frame and also to be flush at the surface thereof with the front end of said head frame.

* * * * *